United States Patent
Dooley et al.

(10) Patent No.: US 8,191,218 B2
(45) Date of Patent: Jun. 5, 2012

(54) DECK SEAM WITH REDUCED SELVAGE

(75) Inventors: David Dooley, Troy, MI (US); Thomas Bush, Harrison Township, MI (US)

(73) Assignee: International Automotive Components Group North America, Inc., Dearborn, MI (US)

(*) Notice: Subject to any disclaimer, the term of this patent is extended or adjusted under 35 U.S.C. 154(b) by 476 days.

(21) Appl. No.: 12/496,154

(22) Filed: Jul. 1, 2009

(65) Prior Publication Data

US 2011/0000061 A1 Jan. 6, 2011

(51) Int. Cl.
*B68G 7/00* (2006.01)
(52) U.S. Cl. ........................................ 29/91.1
(58) Field of Classification Search .............. 29/91.1; 112/475.17, 470.27, 137, 153, 48, 51, 52, 112/417–426, 475.06, 475.08
See application file for complete search history.

(56) References Cited

U.S. PATENT DOCUMENTS

| | | | |
|---|---|---|---|
| 2,290,007 A | 6/1940 | Valentine | |
| 3,762,351 A | 10/1973 | Jager | |
| 4,506,615 A | 3/1985 | Bachtiger | |
| 4,699,420 A | 10/1987 | Priest et al. | |
| 4,987,666 A | 1/1991 | Smith | |
| 5,174,227 A | 12/1992 | Frye et al. | |
| 5,640,917 A | 6/1997 | Nii et al. | |
| 5,885,679 A | 3/1999 | Yasue et al. | |
| 6,116,175 A * | 9/2000 | Ito | 112/475.06 |
| 6,610,958 B2 | 8/2003 | Stricklen | |
| 6,935,260 B2 | 8/2005 | Kromm et al. | |
| 7,278,363 B2 | 10/2007 | Weiczorek et al. | |
| 7,323,236 B2 | 1/2008 | Dexheimer et al. | |
| 7,401,829 B2 | 7/2008 | Michalski et al. | |
| 7,434,272 B2 | 10/2008 | Hannon et al. | |
| 7,690,318 B2 * | 4/2010 | Dooley et al. | 112/475.17 |
| 2002/0158048 A1 | 10/2002 | Stricklen | |
| 2004/0093908 A1 | 5/2004 | Okamoto | |

FOREIGN PATENT DOCUMENTS

| | | |
|---|---|---|
| JP | 2002363841 | 12/2002 |
| WO | 02010494 | 7/2002 |
| WO | 02077344 | 10/2002 |

* cited by examiner

*Primary Examiner* — John C Hong
(74) *Attorney, Agent, or Firm* — Grossman, Tucker, Perreault & Pfleger PLLC

(57) ABSTRACT

A method is provided for forming a welt in a single sheet of coverstock by folding and sewing. A second method is provided for forming a welt adjacent a seam formed by sewing two sheets of coverstock together, the method requiring less selvage from one of the sheets.

12 Claims, 4 Drawing Sheets

DECK SEAM WITH REDUCED SELVAGE

FIELD

This disclosure generally relates to an upholstery seam between adjoining components, in particular components used in the automobile industry. More particularly, the disclosure relates to improved seams which may include a welt.

BACKGROUND

In the automotive industry, there continues to be an effort to create vehicles having aesthetically pleasing exterior and interior designs. The importance of appearance and aesthetic appeal in the automotive interior continues to grow. In particular, attractive upholstered coverings for interior trim, seats, ornamental roof caps and steering wheels aid in selling the modern, high-quality automobile. Customer quality demands continue to raise the bar for potential owner acceptability, and aesthetic appeal has become a critical factor in the marketing of higher profit margin vehicles. One example of such improved aesthetics involves the appearance of seams in upholstered interior and exterior components. In addition, methods of reducing manufacturing costs involved with trim components continue to be needed.

Seams in coverstocks for interior and exterior automotive components may be included simply to break up a broad expanse of material, to accentuate styling lines, to connect different materials together, to allow conformability of the stock to curved surfaces (as in seating) and in the case where the complexity of the curved surface being covered cannot be accomplished with a single sheet of material.

One type of prior art seam that is used on many automotive vehicle interior components, including seats, is a French seam that presents a neat appearance for a joint which joins two pieces of material together at a secured seam. Prior art French seams have been made by applying a foam material to the back side of the leather, vinyl or other types of coverstock to ensure that the foam is secured to the coverstock. One portion of a first material may then be sewn to a portion of a second material. Then the edges may then be flipped over each other and stitches placed a predetermined distance from the joint seam to create a French seam look. The French seam gets the appearance from the foam being compressed on itself creating a hump-like appearance adjacent to the seam thus creating the look that is desired by many automobile designers.

Welts are originally known from the upholstery industry and are generally a rod-shaped element that is bonded, welded or stitched to the coverstock of the upholstery. The welt may be attached along the edges of the upholstery and may be used to position the coverstock in accordance with the shape of the underlying cushion. Conventional welts may comprise a flexible welt core sheathed in a covering material and a laterally protruding welt flap. The sheathing may comprise cut strips of covering material which may be placed around the welt core and bonded or stitched at the ends. The welts produced in this way may then be stitched onto the edges of the sown material.

In addition, welts have been used in the automobile industry, particularly on seats, head rests and arm rests. These welts are mainly used for covering otherwise visible joints between two sheets of material and may be integrally formed by folding the coverstock and creating a standard deck seam as is shown in FIG. 7. In this way, these welts embellish the aesthetic appearance of the automobile interior.

SUMMARY

In a first aspect, the present disclosure is directed at a method of forming a welt within a single sheet of coverstock, the method comprising providing a sheet of coverstock, the sheet having a front surface and a back surface, and folding the sheet over upon itself such that a first portion of the backside overlies a second portion of the backside, creating a first foldline. This may be followed by providing a needle and sewing one or more stitches $S_1$ through the folded sheet, the one or more stitches $S_1$ located at a distance from the first foldline, creating an extended welt head. This may be followed by unfolding the sheet and then folding the sheet over upon itself, around the extended welt head such that a first portion of the front surface overlies a second portion of the front surface, creating two overlying second foldlines. This may be followed by sewing one or more stitches $S_2$ through the folded sheet and through the extended welt head, the one or more stitches $S_2$ located at a distance from the second foldlines that is greater than the distance of the first stitches $S_1$ from the second overlying foldlines. This may be followed by removing selvage from said sheet by cutting the sheet along a line located between the second foldlines and the one or more stitches $S_1$.

In a second aspect, the present disclosure is directed at a method of forming an improved deck seam construction for a welt formed between two sheets of coverstock, the method comprising providing first and second sheets of coverstock, the sheets each having a front surface and a back surface and an edge and placing the first sheet on top of the second sheet with the front surface of each sheet facing the other and with the edge of the second sheet extending beyond the edge of the first sheet. This may be followed by providing a needle and sewing one or more stitches $S_1$ through the first and the second sheets, the one or more stitches $S_1$ located closely adjacent the edge of the first sheet, creating a seam. This may be followed by folding the edge of the second sheet under the first sheet such that the back surface of the sheet overlies the front surface of the second sheet and sewing one or more stitches $S_2$ through the first and second sheets, the one or more stitches $S_2$ located closely adjacent to the edge of the second sheet thereby forming a welt between $S_1$ and $S_2$.

BRIEF DESCRIPTION OF THE DRAWINGS

The above-mentioned and other features and advantages of this disclosure, and the manner of attaining them, will become more apparent and the disclosure will be better understood by reference to the following description of embodiments taken in conjunction with the accompanying drawings, wherein.

DETAILED DESCRIPTION

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

Figure 1:
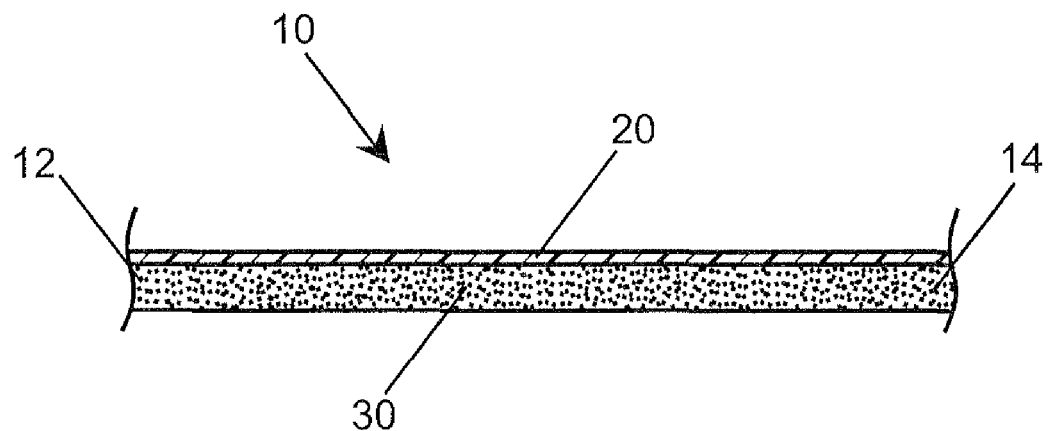
FIG. 1 is a side view of a piece of coverstock used to cover shaped articles according to the present disclosure.

In a first exemplary embodiment, a welt may be formed in a single sheet of coverstock and yield an excellent appearance. FIG. 1 illustrates a side view of a sheet 10 of coverstock which includes a face layer 20 and a layer of foam backing 30. The face layer may comprise a fabric layer, leather or a polymer, such as vinyl, polyurethane and polyolefin, or fiber-reinforced versions of those polymers. The foam backing layer 30 may be applied to the face layer 20 by lamination, by adhesive, by molding liquid precursors or by applying the foam layer with a doctor blade while the foam is liquid.

Figure 2:
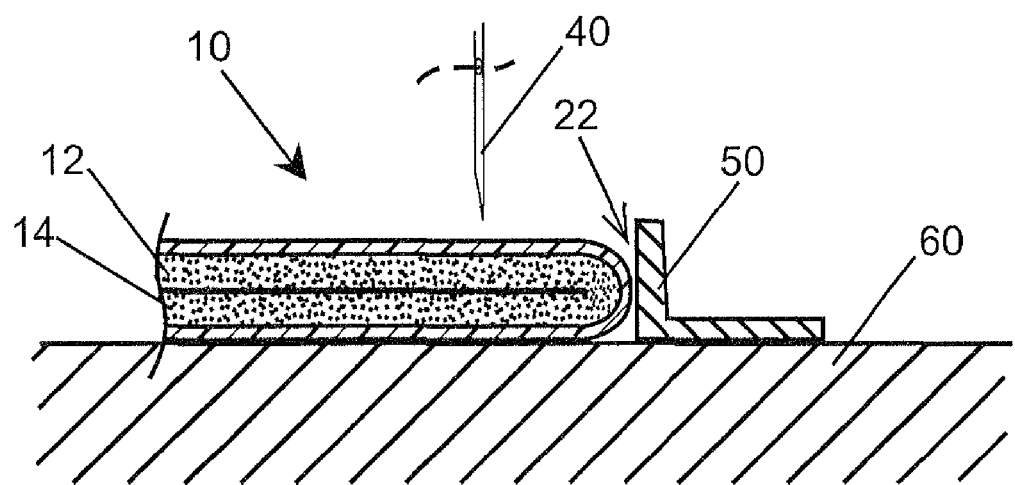
FIG. 2 is a side view of the coverstock of FIG. 1 folded onto itself for deck stitching.
Figure 3:
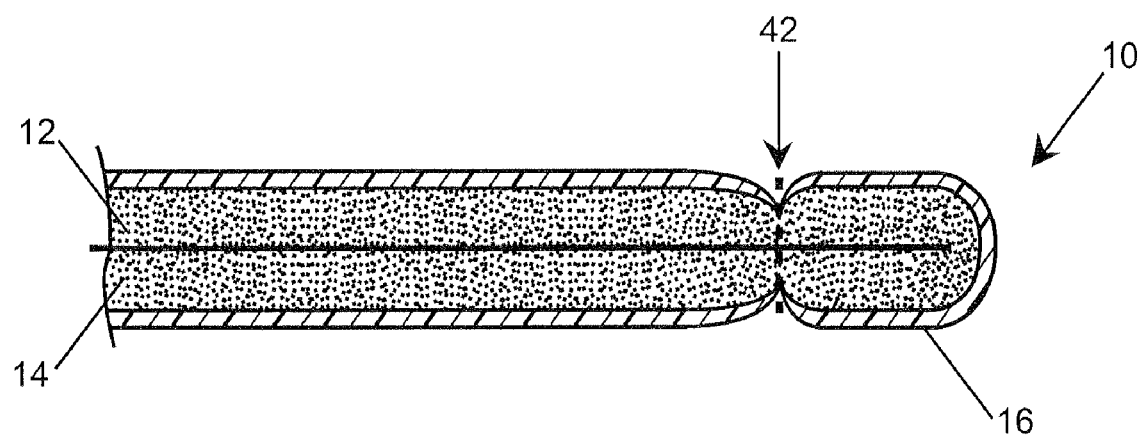
FIG. 3 is a side view of the coverstock of FIG. 2 after being deck stitched.

To produce a welt in a sheet of coverstock, according to the present disclosure, the sheet 10 having ends 12 and 14 first will be folded onto itself such that the backside or foam layer 30 surfaces are in contact. This is illustrated in FIG. 2. This then leaves the two ends of the sheet, 12 and 14 pointing in the same direction. The sheet 10 may then be placed on a flat surface 60 and the foldline 22 of the face layer 20 placed against a vertical surface or fence 50. In addition, a needle 40 may be placed an appropriate distance from the fence 50 such that one or more welt stitches 42 may be sewn through the ends 12, 14 to form an extended welt head 16. This is shown in FIG. 3.

Figure 4:
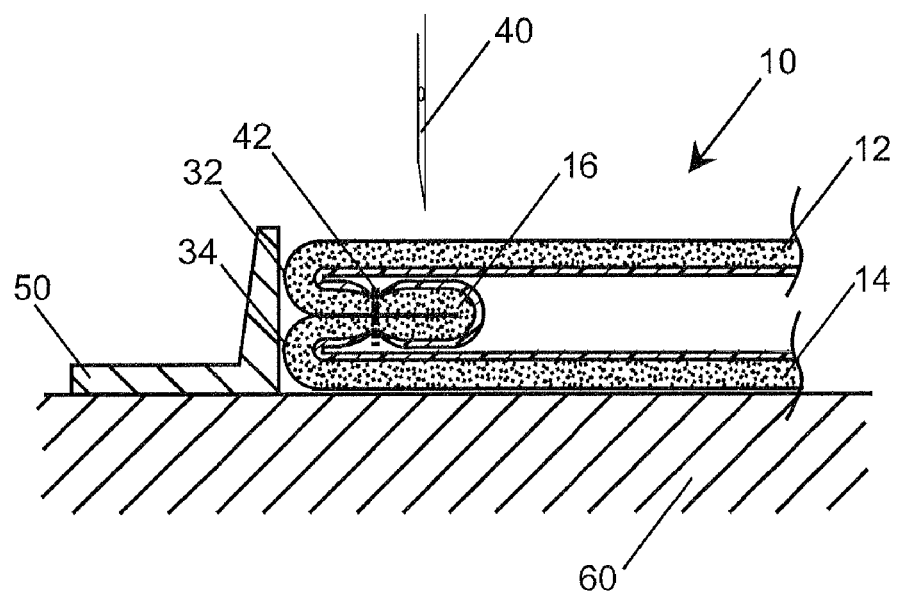
FIG. 4 is a side view of the coverstock of FIG. 3 unfolded over onto itself for join stitching.

Next, as shown in FIG. 4, the ends 12, 14 of the sheet 10 are separated from one another such that the face layer 20 surfaces of the sheet are facing or overlying one another (essentially in the shape of a "W"). The foldlines 32, 34 of the foam layer 30 are then placed against the fence 50 and the needle 40 used to form one or more join stitches 44 as is shown in FIG. 5.

Figure 5:
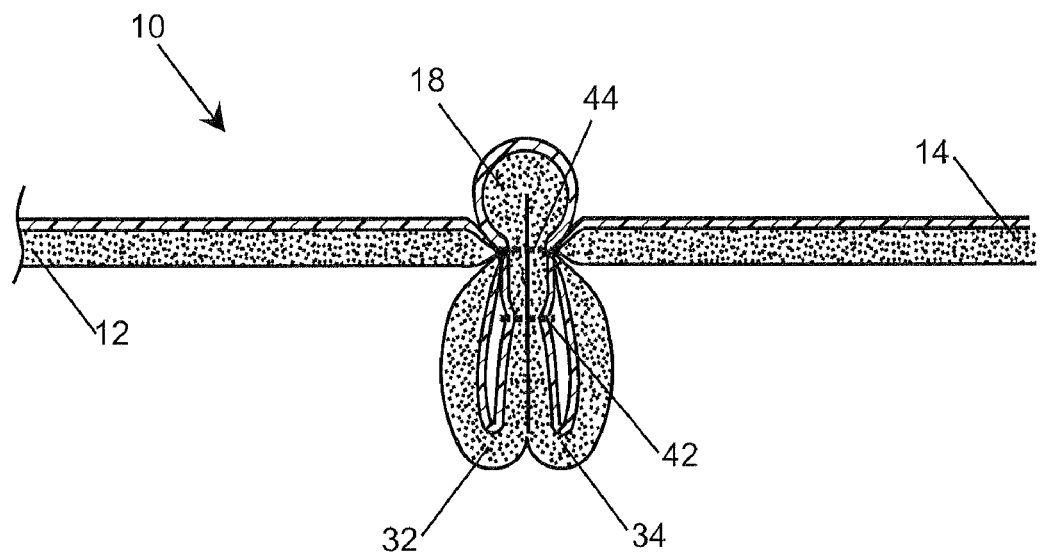
FIG. 5 is a side view of the coverstock of FIG. 4 after the join stitching is complete.

In FIG. 5, the ends 12, 14 of the sheet 10 have been rotated 90° or back into the original position as a flat sheet. An aesthetically pleasing, and in this instance a symmetrical welt 18 has now been formed which protrudes slightly from the surface of the sheet 10. All that remains is to trim the selvage adjacent the foldlines 32, 34 from the sheet 10.

Figure 6:
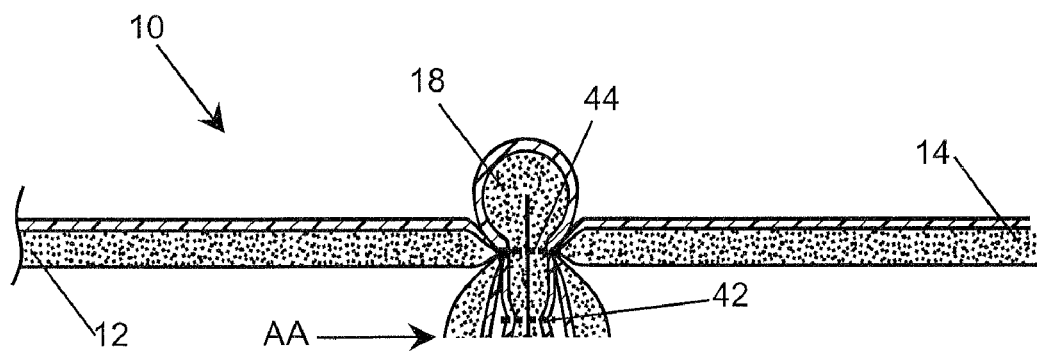
FIG. 6 is a side view of the coverstock of FIG. 5 wherein the excess selvage has been removed to yield a finished seam with welt.

FIG. 6 illustrates the finished sheet 10 of coverstock including a welt 18 formed by inserting stitches 42 and 44 into the folded sheet. The excess material or selvage (bottom portions of the "W") has been trimmed off by cutting along line AA. The finished sheet of coverstock may then be used to attractively cover any number of flat or curved surfaces. Accordingly, a welt has been formed in a single sheet of material.

Figure 7:
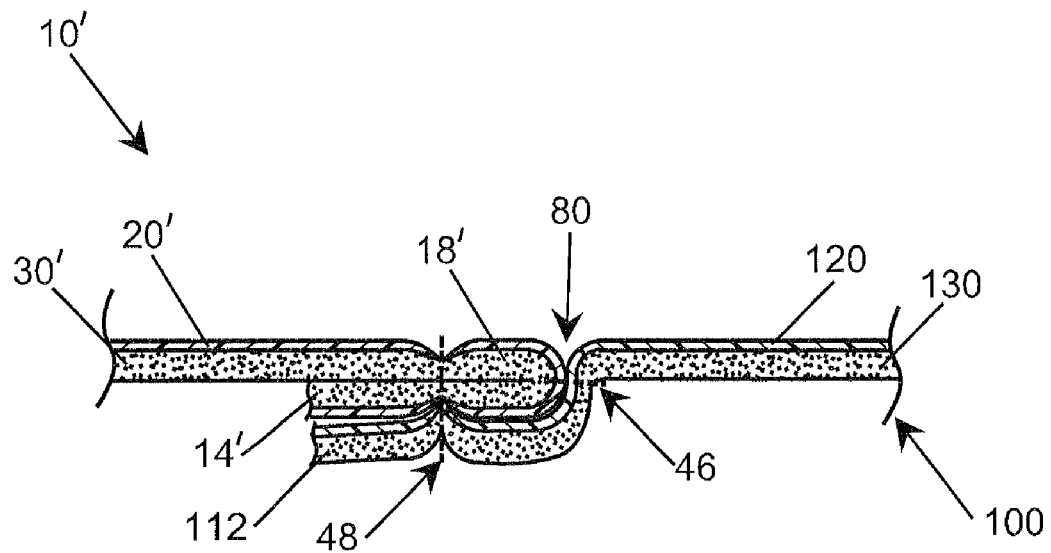
FIG. 7 is a side view of the coverstock of FIG. 1 which has been attached to a second sheet of coverstock and formed into a standard deck seam.

In a second exemplary embodiment, the sheet 10' of coverstock may be attached to a second sheet 100 to form a welt 18' adjacent a seam 80 between the two sheets. FIG. 7 illustrates a conventional construction for a standard deck seam. To create the welt, two sheets of material 10' and 100 are placed face-to-face along an edge 14', 112 and one or more join stitches 46 are sewn to connect the sheets together adjacent that edge and form a seam 80. The end 14' of the first sheet 10' and the matching end 112 of the second sheet 100 are then folded to one side of the seam 80 made by stitch 46 (in the case of FIG. 7, to the left) such that the first sheet 10' is folded over beneath itself and the back surfaces of the foam layer 30' are in contact. This results in the end 112 of a second sheet 100 lying under the fold of the first sheet 10' to form three layers of material.

Next, one or more second stitches 48 may be sewn through all three layers which may locally compress the surface of the first sheet 10' and form a welt 18'.

One disadvantage of this construction is that when used as a coverstock for a relatively thin article or over a flat surface (as on a door panel), the three layers of coverstock may create an unsightly appearance (bump) at the seam/welt. This is particularly true for thicker more plush feeling coverstocks, where the foam layer may be in the order of 6 mm. thick. In addition, this construction provides two edges 14', 112 of selvage or waste material which represent an opportunity for cost reduction of this construction.

The word "selvage" as used herein is understood to mean an excess portion of a sheet of material which may be trimmed off, and as such may be waste or used by recycling.

Figure 8:
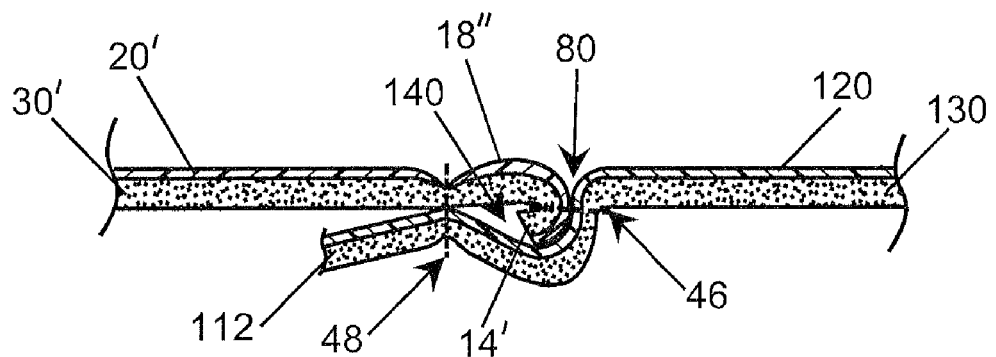
FIG. 8 is a side view of the coverstock of FIG. 1 which has been attached to a second sheet of coverstock, in a second embodiment according to the present disclosure, which uses less material by reducing the selvage of the coverstock of FIG. 1.

FIG. 8 illustrates an improved welt construction where a more prominent welt 18" may be formed by first shortening the end 14' of the first sheet 10' and sewing one or more stitches 46 closely adjacent the end 14' of sheet 10'. Next, as with the construction in FIG. 7, the extended end 112 of the second sheet 100 is then folded to one side of the seam 80 made by join stitch 46 (in the case of FIG. 8 to the left) such that the second sheet 100 is beneath the first sheet 10' and the back surface of the foam layer 30' is in contact with the face layer 120 of the second sheet 100. This results in the end 112 of a second sheet 100 lying under the first sheet 10' to form only two layers of material.

Next, one or more deck stitches 48 may be sown through the two layers which may locally compress the surface of the first sheet 10' and form a welt 18" wherein the end 14' of the first sheet 10' is trapped between the sheets 10', 100 and caused to form a hook configuration 140.

Thus, an improved welt line is formed having a more prominent feature and a seam having a reduced thickness of about 50%. Further, a significant amount of trim waste or selvage 14' is eliminated providing a savings in material usage, particularly for high volume applications of this invention, such as in the automotive industry.

It is contemplated that the welts and seams as disclosed herein may be formed from a coverstock which does not include a foam backing, that is, comprising face goods only.

It is further contemplated that the features of the present disclosure may find use in suitable applications in other transportation industries as well as in upholstery for the home and office.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of forming a welt within a single sheet of coverstock, the method comprising:
    providing a sheet of coverstock, said sheet having a front surface and a back surface;

folding said sheet over upon itself such that a first portion of said back surface overlies a second portion of said back surface, creating a first foldline;

providing a needle and sewing one or more stitches $S_1$ through said folded sheet, said one or more stitches $S_1$ located at a distance from said first foldline, creating an extended welt head;

unfolding said sheet;

folding said sheet over upon itself, around said extended welt head such that a first portion of said front surface overlies a second portion of said front surface, creating two overlying second foldlines;

sewing one or more stitches $S_2$ through said folded sheet and through said extended welt head, said one or more stitches $S_2$ located at a distance from said second foldlines that is greater than the distance of said first stitches $S_1$ from said second overlying foldlines;

removing selvage from said sheet by cutting said sheet along a line located between said second foldlines and said one or more stitches $S_1$.

2. The method of claim 1 wherein said sheet of coverstock comprises a face layer and a foam backing layer.

3. The method of claim 2 wherein said face layer comprises fabric, leather, a polymer or a fiber-reinforced polymer.

4. The method of claim 1 wherein said sheet comprises fabric, leather, a polymer or a fiber-reinforced polymer.

5. The method of claim 4 wherein said polymer comprises vinyl, polyurethane or polyolefin.

6. The method of claim 1 wherein the welt is formed for an armrest, a headrest, a seat cushion, a seat back, an instrument panel or a roof cap.

7. A method of forming an improved deck seam construction for a welt formed between two sheets of coverstock, the method comprising:

providing first and second sheets of coverstock, said sheets each having a front surface and a back surface and an edge;

placing said first sheet on top of said second sheet with said front surface of each sheet facing the other and with said edge of said second sheet extending beyond said edge of said first sheet;

providing a needle and sewing one or more stitches $S_1$ through said first and said second sheets, said one or more stitches $S_1$ located closely adjacent said edge of said first sheet, creating a seam;

folding said edge of said second sheet under said first sheet such that said back surface of said first sheet overlies said front surface of said second sheet;

sewing one or more stitches $S_2$ through said first and second sheets, said one or more stitches $S_2$ located closely adjacent to said edge of said second sheet thereby forming a welt between $S_1$ and $S_2$.

8. The method of claim 7 wherein one or both of said first and said second sheets of coverstock comprises a face layer and a foam backing layer.

9. The method of claim 8 wherein said face layer comprises fabric, leather, a polymer or a fiber-reinforced polymer.

10. The method of claim 7 wherein one or both of said first and said second sheets comprises fabric, leather, a polymer or a fiber-reinforced polymer.

11. The method of claim 10 wherein said polymer comprises vinyl, polyurethane or polyolefin.

12. The method of claim 7 wherein the welt is formed for an armrest, a headrest, a seat cushion, a seat back, an instrument panel or a roof cap.

* * * * *